(No Model.) 3 Sheets—Sheet 1.

G. F. CARD.
COUPLING FOR ELECTRIC BRAKES.

No. 372,599. Patented Nov. 1, 1887.

Attest:
Emma Arthur
Geo. H. Knight Jr.

Inventor:
George F. Card
By Knight Bros.
Attys.

(No Model.)  3 Sheets—Sheet 2.
G. F. CARD.
COUPLING FOR ELECTRIC BRAKES.
No. 372,599.  Patented Nov. 1, 1887.
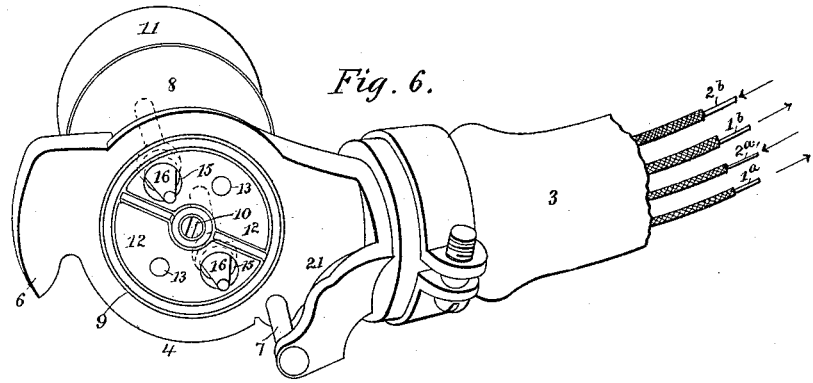

(No Model.)  3 Sheets—Sheet 3.

G. F. CARD.
COUPLING FOR ELECTRIC BRAKES.

No. 372,599.  Patented Nov. 1, 1887.

Attest:
Geo. H. Knight Jr
Emma Arthur

Inventor:
George F. Card
By Knight Bros.
attys

United States Patent Office.

GEORGE F. CARD, OF COVINGTON, KENTUCKY, ASSIGNOR TO HENRY K. LINDSEY, OF CINCINNATI, OHIO.

COUPLING FOR ELECTRIC BRAKES.

SPECIFICATION forming part of Letters Patent No. 372,599, dated November 1, 1887.

Application filed January 24, 1887. Serial No. 225,374. (No model.)

*To all whom it may concern:*

Be it known that I, GEORGE F. CARD, of Covington, Kenton county, Kentucky, have invented a new and useful Coupling for Electric-Brake Circuits, of which the following is a specification.

My invention relates to a device whereby the conducting-wires of an electric-brake system for railway-trains may be easily and certainly coupled up from vehicle to vehicle and may be as readily uncoupled, either manually (by the brakeman) or automatically, (by a rupture of the train at that part.) The construction of my coupling is, further, such that in each member when in the uncoupled condition the outgoing and the returning conductors are held automatically in metallic contact, so as to secure a closed or complete circuit, but also such that the act of coupling or engaging the component members or catches opens the said contact of outgoing and returning conductors and makes or closes contact of outgoing with outgoing and of returning with returning conductors from vehicle to vehicle throughout the train.

My said couplings may be and are herein shown as "compound," by which is meant that they may serve as conduits for more than one circuit—as, for example, for a brake-circuit and for an alarm or signal circuit.

The attachment of my said electric couplings may be such as to constitute their respective members permanent appendages of the vehicles to which they are applied; but their mode of attachment is preferably such as to render them capable of ready application to or removal from any particular vehicle, as hereinafter specifically shown.

Figure 3:
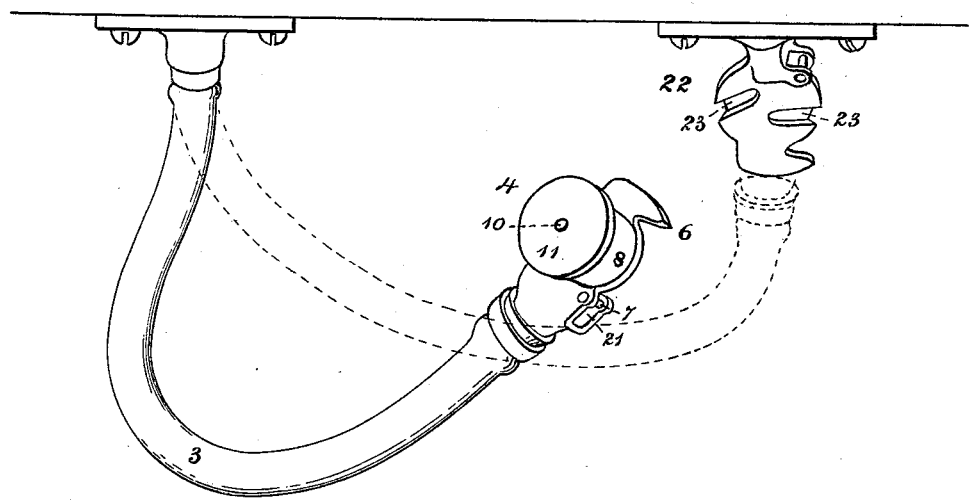
Figure 2:
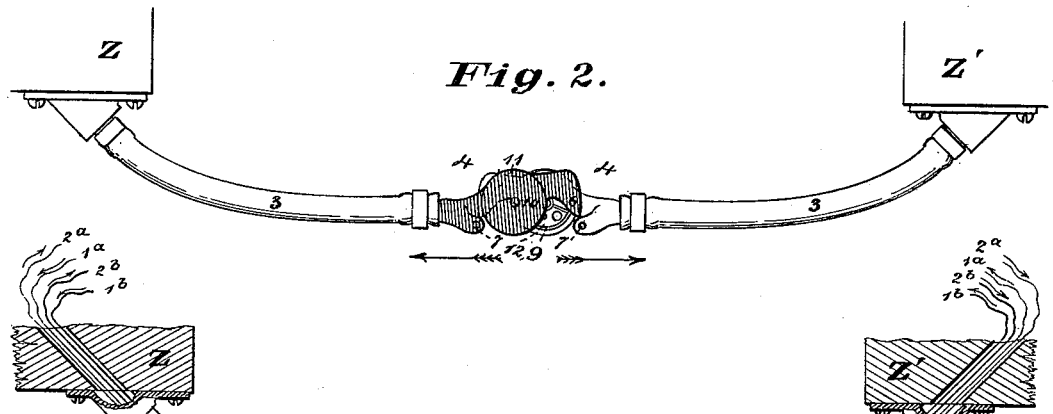
Figure 1:
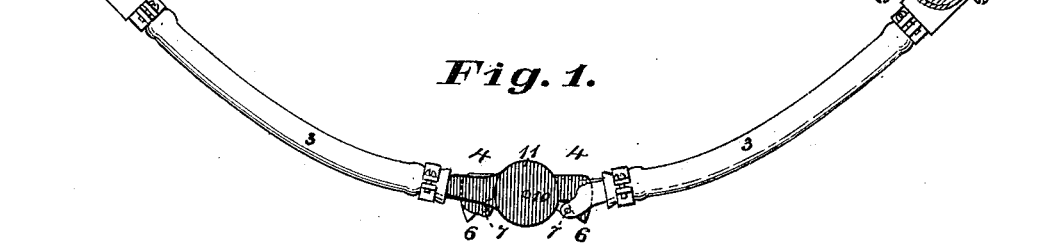
Figure 9:
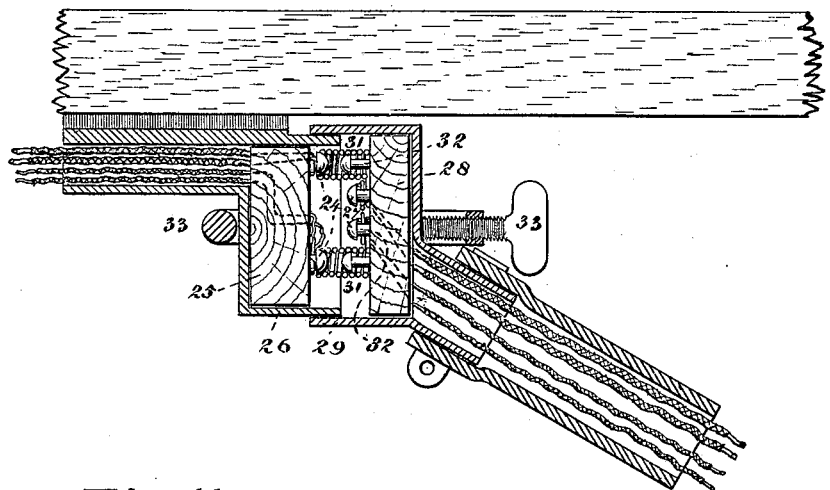
Figure 11:
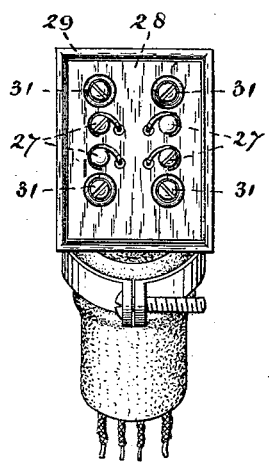
Figure 12:
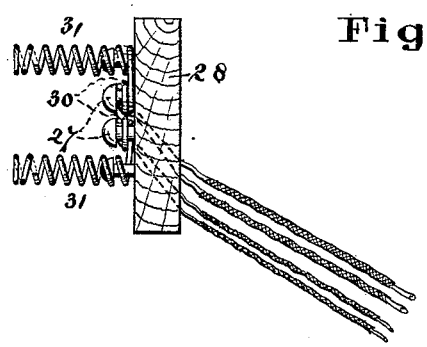
Figure 10:
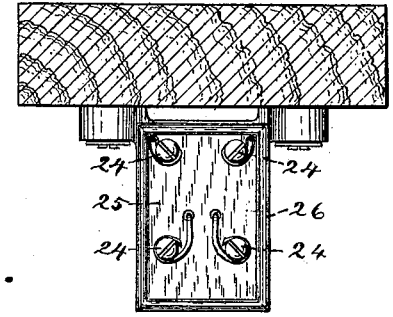

In the accompanying drawings, Figure 1 is a partly-sectioned elevation of my device in its coupled condition. Fig. 2 represents the same in the act of being automatically uncoupled by the recession of the vehicles. Fig. 3 represents a member of my coupling and its hanger. Fig. 4 is a back view of a member without its cap. Fig. 5 is a partly-sectioned back view of a member. Fig. 6 is a front view of a member. Fig. 7 is an axial section through my coupling in its coupled condition. All the above figures represent a form of my device adapted for two circuits—say a brake-circuit and an alarm or signal and telephone circuit. Fig. 8 represents one member of a form of my device adapted for a single circuit. Fig. 9 illustrates by vertical section a mode of attachment of a coupling member to a vehicle which permits such member to be readily unshipped or detached for any purpose—such as inspection, repair, or storage, or for transfer to another vehicle. Figs. 10 and 11 are face views showing, respectively, the portion which remains permanently attached to the vehicle and the portion which is removable with the coupling member proper. Fig. 12 is a side elevation of the contact devices of said separable portion.

All the above figures represent the members adapted for a right-hand grip. Of the said figures, Fig. 4 represents the rear side of the member whose front or contact side is shown in Fig. 6, while Fig. 5 represents the opposing member or mate thereto, and Fig. 7 shows both members coupled together.

The two members of my coupling being absolute fac-similes, description of one applies to both.

Z Z may represent parts of two consecutive vehicles of a railway-train.

The device will be described adapted for the use of two circuits.

$1^a\ 2^a$ and $1^b\ 2^b$ may represent line-wires or conductors of two electric circuits thereon—as, for example, an alarm-circuit and a brake-circuit. Thus $1^a$ and $2^a$ respectively represent the outgoing and returning wires of an alarm-circuit, and $1^b\ 2^b$ the outgoing and returning wires of a brake-circuit. The said conductors, having been separately "jacketed," are "cabled" in a rubber or other flexible tube, 3, properly fastened by one of its extremities to the vehicle and having secured to its other or free extremity a hook or catch, 4, of any suitable diamagnetic metal. A tubular wrist, 5, enables attachment of the catch to the free extremity of the tube 3 and serves as a conduit for the conductors to the contact-pieces. Each member is perfectly flat throughout that side of it which comes in contact with the other member in coupling, and each has a claw, 6, which can be engaged over a pin, 7, on the other member. A converging cheek, 21, upon each member causes the two to be pressed into close juxtaposition in the act of coupling. A cylindrical chamber, 8, has fitted snugly within it a block or plug, 9, of vulcanite or other suitable insulator, which is held in place by means of a screw, 10, and cap 11. The front face of the plug 9 is suitably recessed for two semicircular brass plates, 12, (called the "contact-plates,") which are held in place by screws 13, which serve as binding-posts for the wires $2^a$ $2^b$, that conduct the outgoing currents to the said contact-plates, whence, in the coupled condition of the device, the currents pass through the plates 12 into contact-pins 14 (whose points 16 impinge against said plates) of the other member, and then into the corresponding conductors $1^a$ $1^b$ of that member, and when in the uncoupled condition of the device the conical points 16 project through the holes 15 and bring the collars 17 in contact with plates 12 and allow the currents to return through pins 14 and wires $1^a$ $1^b$ to the battery or other current-generator at that end of the train.

To accomplish the above objects the contact-plates have orifices 15 of so much greater diameter than the conical heads 16 of the yielding contact-pins as to be out of contact with said pins in the coupled condition of the device, (see Fig. 7,) but also such as to make contact with the collars 17 of said pins in the uncoupled condition. (See Fig. 6.) Helical springs 18 operate to hold said collars against the rear surface of the contact-plates 12 of the containing member in the uncoupled condition, but permit the contact-pins 14 to yield and thus become insulated from the said contact-plates in the coupled condition, as clearly shown in Fig. 7. The said collared contact-pins 14 and their springs 18 occupy and are guided by cylindrical orifices 19 in the plug 9.

Caps 20 may discharge the functions of binding-posts for the wires which connect with the yielding contact-pins 14.

It will be noted that, once engaged, the weight or sag of the device keeps it securely coupled until it is either drawn forcibly taut by recession of the vehicles, as in Fig. 2, or the members are purposely uncoupled by a manipulation the reverse of that employed in coupling them.

The wires $1^a$ $2^a$ $1^b$ $2^b$ may extend the whole length of the car-body, but are preferably bound or soldered to insulated rods of copper or iron, which, extending the length of the body, do duty as conductors at that part.

Fastened to the under side of the car-body is a hanger, 22, having a hook and a catch-pin precisely like those on the coupling to receive and hold a disengaged member, so as to protect it from collision, dust, and atmospheric influences. The otherwise flat contact-face of this hanger has preferably two grooves or recesses, 23, of such dimensions as to place the protruding heads of the pins 14 out of contact with said hanger in order that such suspension of a disengaged member may have no effect on the circuit, which consequently remains closed in said member until its re-engagement with the like member upon another vehicle, as already explained.

My invention has been described in its application to two circuits, that being the number which it is expected to most commonly employ; but the principle is manifestly equally applicable to either a greater number of circuits or to a single circuit. Thus three circuits might be thus assembled, requiring three contact-pins and as many contact-plates and binding-screws. On the other hand, such coupling may be used for one circuit only, a single contact-pin and a single contact-plate, as represented in Fig. 8, then sufficing.

If it be preferred that the act of suspending a disengaged member upon the hanger shall break one or both circuits, the corresponding grooving is omitted; or, an additional (grooveless) hanger being fastened to the car-body for that purpose, the attendant can either open the circuit or permit it to remain closed at will by the mere act of engagement with one or other hanger.

Such coupling may obviously be constructed either for a right-hand grip, as represented, or for a left-hand grip, and would operate equally well either way; but, inasmuch as a member constructed for one kind of grip would not couple with a member constructed for the other kind, it is necessary to select once for all and adhere to one kind. I have accordingly determined that such couplings shall be constructed invariably for a right-hand grip—that is to say, each coupling member is constructed so as its contact-face will be on the left-hand side when held in the right hand, in the usual manner, with the pipe toward you.

The construction of the impinging parts of the two members of the coupling will be seen to be such as, on the one hand, to bring and hold terminals in intimate contact in the sagging condition shown in Fig. 1, and, on the other hand, to facilitate liberation when relieved of sag, as shown in Fig. 2.

The above-described coupling members may, as represented in Figs. 1, 2, and 3, constitute permanent appendages of the vehicle to which they are applied; but a preferred form of attachment to the vehicle is shown in Figs. 9, 10, 11, and 12, in which the terminals of the conductors that remain permanently fixed to the vehicle, consist of binding-screws 24, that fasten the ends of said conductors to a block, 25, composed of vulcanized fiber or other suitable non-conducting material, secured within a metallic housing, 26, which is made fast to the car-body. The conductors of the removable portion are similarly fastened, by means of binding-screws 27, in a block, 28, of insulating material, secured within a housing, 29, whose form and dimensions adapt it to fit snugly either outside, as shown, or inside said fixed housing 26. Wires 30, that extend from the binding-screws 27, take the form of helical terminals 31, which are secured by binding-screws 32 to said block 28 in such position as, when said separable and fixed portions are clamped together, to make electrical connection by bringing the said helices 31 of the separable portion in intimate contact with the said terminals 24 of the fixed portion. Intimate contact is obtained of the said terminals 31 and 24 by any suitable means—such, for example, as a screw-clamp, 33, which may be either entirely detachable or may be connected loosely to the vehicle by a chain or other like fastening.

Integral metallic continuity may be secured by a drop of solder at each binding-screw junction, and proper surface-contact of the separable terminals may be secured by fitting them to each other, as shown in Figs. 9 and 12.

Instead of the described screw-clamp, any suitable fastening device—such, for instance, as the familiar screw-threaded sleeve or "union"—may be employed, or contact of the separable and fixed portions may be effected by instrumentalities similar to those above described for the couplings proper.

The helical terminals might, of course, be on the fixed instead of on the separable portions.

I claim as new and of my invention—

1. The combination, with two identically-constructed coupling members, 4, each having a claw, 6, pin 7, and converging cheek 21, for locking them together, of the chambers 8, insulating-plugs 9 in said chambers, binding-screws 13 in said insulating-plugs, yielding contact-pins 16, having conical points, contact-plates on plugs 9, in electrical communication with screws 13, and having perforations for the passage of said conical-pointed contact-pins, and springs on said pins for holding the latter in contact with the contact-plate of the adjacent coupling member when coupled and with the plate of its own member when uncoupled.

2. The combination, with the fixed and the separable portion of a coupling member, of the helical terminals 31, binding-screws 24, conductors connected to said screws, and means for holding said helical terminals in intimate contact with said screws, substantially as set forth.

In testimony of which invention I hereunto set my hand.

GEORGE F. CARD.

Attest:
H. G. LEWIS,
GEO. H. KNIGHT.